(12) United States Patent
Murasaki et al.

(10) Patent No.: US 10,820,719 B2
(45) Date of Patent: Nov. 3, 2020

(54) SKIN-MATERIAL FIXING TOOL

(71) Applicant: YKK Corporation, Tokyo (JP)

(72) Inventors: Ryuichi Murasaki, Tokyo (JP); Takefumi Adachi, Tokyo (JP); Genta Matsumura, Tokyo (JP); Tetsuya Fukuzawa, Kurobe (JP); Wanli Zhang, Kurobe (JP); Hikaru Okuyama, Kurobe (JP)

(73) Assignee: YKK Corporation (JP)

( * ) Notice: Subject to any disclaimer, the term of this patent is extended or adjusted under 35 U.S.C. 154(b) by 95 days.

(21) Appl. No.: 16/087,264

(22) PCT Filed: Mar. 23, 2016

(86) PCT No.: PCT/JP2016/059163
§ 371 (c)(1),
(2) Date: Sep. 21, 2018

(87) PCT Pub. No.: WO2017/163328
PCT Pub. Date: Sep. 28, 2017

(65) Prior Publication Data
US 2019/0104859 A1    Apr. 11, 2019

(51) Int. Cl.
*A47C 31/02* (2006.01)
*B68G 7/052* (2006.01)
(Continued)

(52) U.S. Cl.
CPC ............ *A47C 31/023* (2013.01); *A47C 31/02* (2013.01); *B68G 7/052* (2013.01);
(Continued)

(58) Field of Classification Search
None
See application file for complete search history.

(56) References Cited

U.S. PATENT DOCUMENTS 9,834,431 B2 * 12/2017 Agonia .................... B68G 7/12
2007/0257531 A1   11/2007 Mashimo
(Continued)

FOREIGN PATENT DOCUMENTS

| CN | 104936537 A | 9/2015 |
| JP | 2006-095093 A | 4/2006 |

(Continued)

OTHER PUBLICATIONS

International Search Report, PCT Patent Application No. PCT/JP2016/059163, dated Jun. 21, 2016.
(Continued)

*Primary Examiner* — David R Dunn
*Assistant Examiner* — Christopher E Veraa
(74) *Attorney, Agent, or Firm* — Kilpatrick Townsend & Stockton LLP

(57) ABSTRACT

There is provided a cover-material fixing tool. A cover-material fixing end member is configured to be attached on a cover-material. A clip is configured to be attached on a cover-material fixing end member. The cover-material fixing end member includes a tape member, a clip locking member, and a plurality of stoppers. The clip includes a locking portion for holding the clip locking member to allow the clip locking member to move in a longitudinal direction, and a locking protrusion protruding toward the clip locking member and configured to abut against the stoppers. The clip is movable between the adjacent stoppers to allow position adjustment thereof.

6 Claims, 10 Drawing Sheets

(51) Int. Cl.
*A44B 17/00* (2006.01)
*A44B 99/00* (2010.01)
*B60N 2/58* (2006.01)
*B68G 7/12* (2006.01)

(52) U.S. Cl.
CPC .......... *A44B 17/0064* (2013.01); *A44B 99/00* (2013.01); *B60N 2/5825* (2013.01); *B68G 7/12* (2013.01)

(56) References Cited

U.S. PATENT DOCUMENTS

| | | | |
|---|---|---|---|
| 2009/0140569 A1 | 6/2009 | Mashimo | |
| 2012/0284974 A1* | 11/2012 | Yamamoto | A47C 31/023 24/458 |
| 2013/0117973 A1* | 5/2013 | Murasaki | A47C 31/023 24/581.11 |
| 2014/0352117 A1* | 12/2014 | Murasaki | A47C 31/023 24/581.11 |
| 2015/0033516 A1* | 2/2015 | Saiga | B68G 7/12 24/594.1 |
| 2015/0230799 A1 | 8/2015 | Satake et al. | |
| 2016/0167554 A1* | 6/2016 | Murasaki | B60N 2/5825 297/452.61 |
| 2016/0174719 A1* | 6/2016 | Saiga | B68G 7/12 24/531 |
| 2016/0249746 A1* | 9/2016 | Saiga | A47C 31/023 24/545 |
| 2016/0264030 A1* | 9/2016 | Saiga | B60N 2/5825 |
| 2018/0193022 A1 | 7/2018 | Satake et al. | |

FOREIGN PATENT DOCUMENTS

| | | |
|---|---|---|
| JP | 2007-260340 A | 10/2007 |
| JP | 2009-100924 A | 5/2009 |
| JP | 3163446 U | 9/2010 |
| JP | 3186511 U | 9/2013 |
| WO | 2013/069114 A1 | 5/2013 |
| WO | 2015/063944 A1 | 5/2015 |
| WO | 2015/068311 A1 | 5/2015 |

OTHER PUBLICATIONS

Written Opinion, PCT Patent Application No. PCT/JP2016/059163, dated Jun. 21, 2016.
Office Action, Korean Patent Application No. 10-2018-7027592, dated Dec. 10, 2019.
English Translation of Written Opinion, PCT Patent Application No. PCT/JP2016/059163, dated Jun. 21, 2016.
Office Action, Chinese Patent Application No. 201680083942.8, dated Apr. 20, 2020, 17 pages.

* cited by examiner

FIG.1A
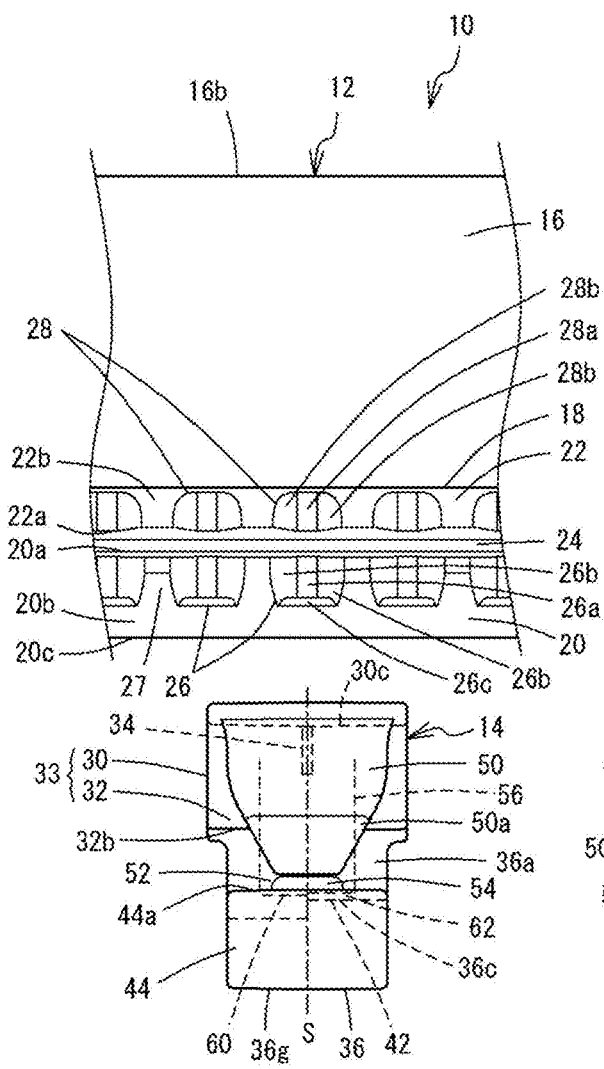
FIG.1B
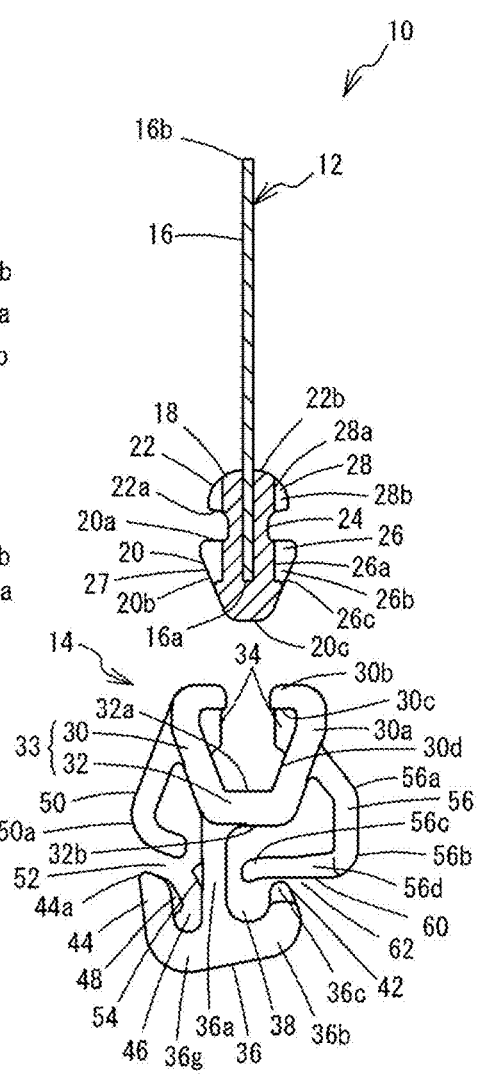

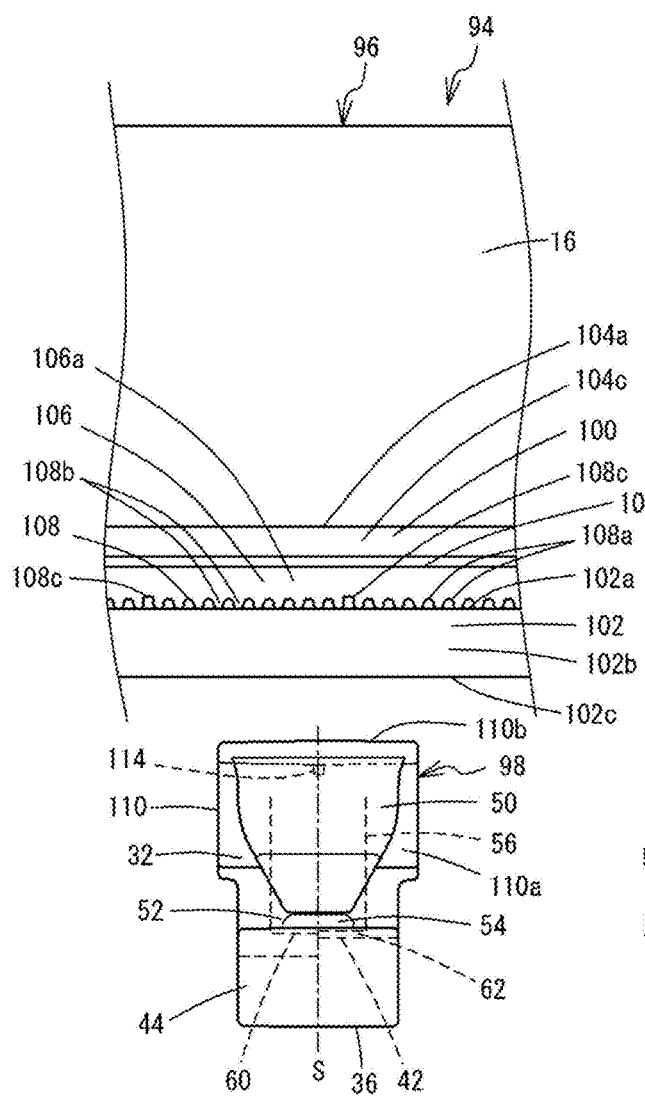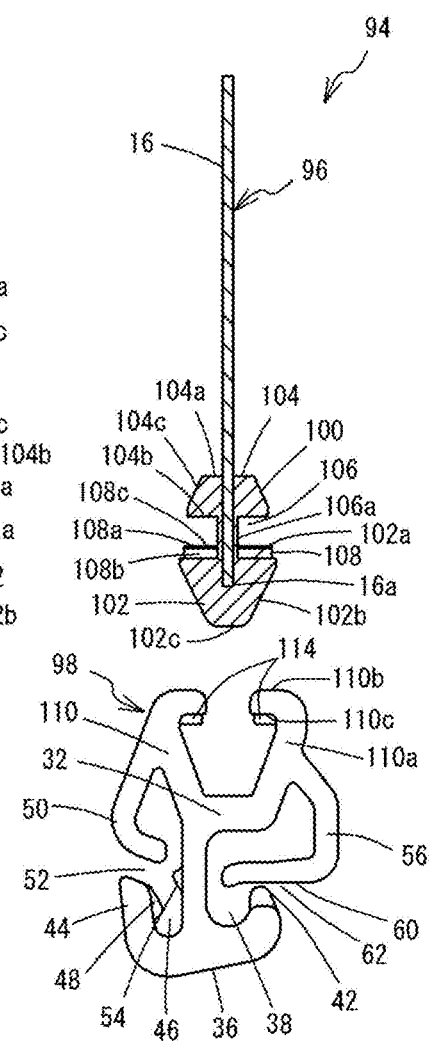

SKIN-MATERIAL FIXING TOOL

TECHNICAL FIELD

The present invention relates to a cover-material fixing tool used for fixing a cover-material intended to cover a surface of chairs, seats or the like.

BACKGROUND ART

Conventionally, in chairs used indoors, vehicle seats or the like, ones are often used, in which a cushion material or flexible pad is installed on a part thereof to be touched by a human body, such as a seat surface or a back rest, and then a surface thereof is covered with a cover-material. Various structures are employed to fix the cover-material. In order to fix and externally conceal the cover-material, a structure is known, in which a wire is arranged in a groove of a cushion material, a cover-material fixing tool, on which a plurality of clips are locked, is provided on an end edge of the cover-material, and then the clips are engaged with the wire, thereby fixing the cover-material.

The cover-material fixing tool is provided with a cover-material fixing end member for connecting the cover-material with the clips. The cover-material fixing end member is provided with a clip locking member configured to allow the clips to be locked thereon. The clip locking member has various shapes. Each of the clips has a chuck portion configured to be engaged to a locking end of the cover-material fixing end member and a hook portion configured to be hooked and locked on the wire installed in the groove of the cushion material. In order to facilitate an operation of hooking the hook portion onto the wire, various shapes are proposed for the hook portion.

For example, a fixing clip disclosed in Patent Document 1 is configured to be attached on a cover-material via a cover-material fixing end member. The cover-material fixing end member is configured such that a bead line having a larger cross-sectional shape is provided along a longitudinal edge of a belt cloth and then the belt cloth is stitched and attached on an end of a trim cover. The fixing clip is provided with a chuck portion configured to allow a position thereof to be adjusted along the longitudinal direction of the bead line.

For example, a cover-material fixing clip disclosed in Patent Document 2 is configured to be attached on a cover-material via a locking tape. The locking tape is stitched on the cover-material at one side edge portion, and on a side edge portion thereof opposite to the stitched portion, a clip locking member is provided to be fitted between a pair of locking claws as a chuck portion of the cover-material fixing clip. The clip locking member is formed in a generally V shape along a longitudinal direction of the locking tape and has locking grooves formed at equal intervals along the longitudinal direction of the locking tape. Also, the locking claws of the cover-material fixing clip are provided with a locking protrusion as a stopper, which is to be inserted into the locking grooves, and thus the cover-material fixing clip can be locked on any locking grooves of the locking tape.

PRIOR ART DOCUMENT

Patent Document

Patent Document 1: Japanese Patent Application Publication No. 2006-095093A

Patent Document 2: Japanese Utility Model Registration Publication No. 3186511U

SUMMARY OF INVENTION

Problems to Be Solved by Invention

In the above background arts, the cover-material fixing end member disclosed in Patent Document 1 does not have a measure to longitudinally lock the clips fixed thereon and thus allows the clips to freely slide thereon. Accordingly, there are problems that it is difficult to lock the clips at a desired location on the cover-material and the wire and also workability when attaching the clips to the wire is not good.

On the other hand, the cover-material fixing end member disclosed in Patent Document 2 is configured to longitudinally lock the clips fixed thereon, and thus workability when attaching the clips to the wire is good. The clips can be freely slid relative to the wire. Accordingly, even if a shape of the cover-material does not conform to a shape of a cushion material due to deviations occurring upon cutting or stitching of the cover-material, an internal stress therein can be released by sliding the clips relative to the wire. As a result, wrinkles do not occur on the cover-material so that the cover-material can be neatly finished. However, the wire has a part covered with the cushion material so that the clip is not hooked thereon. When a part of the wire exposed from the cushion material is short, there is no freedom of position adjustment of the clip. Accordingly, since the internal stress cannot be released, wrinkles are likely to occur on the cover-material, thereby causing a bad external appearance.

The present invention has been made keeping in mind the problems of the above background arts, and an object thereof is to provide a cover-material fixing tool, in which a cover-material can be hooked on a wire in a cushion material by a simple operation and also the cover-material can be flatly covered on a surface of the cushion material, thereby providing a good external appearance.

Means for Solving Problems

The present invention is a cover-material fixing tool configured to be attached on a cover-material and also to be locked on a locked member, such as a wire, installed in a cushion material, including: a cover-material fixing end member configured to be attached on the cover-material; and a clip configured to be attached on the cover-material fixing end member, wherein the cover-material fixing end member includes a tape member configured to be fixed on an end edge portion of the cover-material; a clip locking member attached along a longitudinal direction on a side edge portion of the tape member opposite to the cover-material; and a plurality of stoppers formed on the clip locking member at equal intervals along the longitudinal direction, wherein the clip includes a locking portion for holding the clip locking member to allow the clip locking member to move in the longitudinal direction; and a locking protrusion protruding toward the clip locking member and configured to abut against the stoppers, wherein the clip is movable between the adjacent stoppers to allow position adjustment thereof.

Also, on the clip locking member, a plurality of locking recess portions configured to allow the locking protrusion of the clip to be inserted therein may be formed at equal intervals along the longitudinal direction, a part between each pair of locking recess portions may define each of the stoppers, and a length of the locking recess portions in the longitudinal direction may be formed to be greater than a width of the locking protrusion in the longitudinal direction. The locking portion of the clip may be provided with a pair of locking claws for holding the clip locking member, and the locking protrusion may be provided on each of opposing inner surfaces of arm portions of the pair of locking claws.

The locking protrusion is preferably provided at a middle location in a thickness of each of the locking claws.

The adjacent stoppers may have a contact surface with the locking protrusion, and the contact surface may be inclined toward a distal end side of the stoppers in a protruding direction thereof, so that the locking recess portions are widened. A length obtained by subtracting the width of the locking protrusions from the length of the locking recess portions in the longitudinal direction may be shorter than a length from an end portion of the locking claws to the locking protrusions.

Further, the clip locking member may have a lower edge portion formed to allow the pair of locking claws to be held thereon. Also, on a side surface wall portion of the groove portion, which is a surface parallel to a side surface of the tape member, a plurality of ridges and valley portions between each pair of ridges may be consecutively provided along the longitudinal direction to allow the locking protrusion to be locked thereon, and the stoppers may be provided at equal intervals along the longitudinal direction to further protrude than the ridges.

Further, on an upper surface of the clip locking member, which is a surface positioned along a right and left direction of the tape member, a plurality of ridges and valley portions between each pair of ridges may be consecutively provided along the longitudinal direction to allow the locking protrusion to be locked thereon, and the stoppers may be provided at equal intervals along the longitudinal direction to further protrude than the ridges.

On the clip locking member, a plurality of locking recess portions configured to allow the locking protrusion of the clip to be inserted therein may be formed at equal intervals along the longitudinal direction, a part between each pair of locking recess portions may define each of the stoppers, and a length of the locking recess portions in the longitudinal direction may be formed to be greater than a width of the locking protrusion in the longitudinal direction. The locking portion of the clip may be provided with a pair of locking claws for holding the clip locking member, and the locking protrusion may be provided on each of opposing inner surfaces of arm portions of the pair of locking claws. Each of the locking recess portions may be provided with a flat surface portion, which is a surface parallel to a side surface of the tape member. A distance between a pair of locking protrusions may have such a length that, when the locking protrusions are respectively inserted from both sides into a pair of locking recess portions located on both side of the cover-material fixing end member with the tape member interposing therebetween, the locking protrusions respectively abut against the flat surface portions, thereby allowing the pair of locking claws to clamp the locking recess portions therebetween so that sliding thereof along the longitudinal direction is locked by a frictional force.

Advantageous Effects of Invention

According to the cover-material fixing tool of the present invention, the cover-material can be hooked on the locked member in the cushion material or the like by a simple operation, thereby providing a good operability. Also, a position of the clip attached on the cover-material can be slightly moved. Even if the cover-material does not conform to a shape of the cushion material due to deviations occurring upon cutting or stitching of the cover-material, an internal stress therein can be released by moving the clip. As a result, wrinkles do not occur on the cover-material so that the cover-material can be flatly covered on the cushion material and thus can be neatly finished. Therefore, it is possible to make a chair or a seat have a good external appearance. Further, the cover-material fixing end member to be attached on the cover-material has a high rigidity in an upward and downward direction and a certain degree of flexibility in a right and left direction. Accordingly, it is possible to deform the cover-material fixing end member to conform to a curved shape of the cushion material. Likewise, wrinkles or unevenness does not occur and thus a good external appearance can be obtained.

BRIEF DESCRIPTION OF DRAWINGS

FIGS. 1A and 1B are respectively a front view and a right side view showing a part of a cover-material fixing tool according to a first embodiment of the present invention.

FIGS. 9A and 9B are respectively a front view and a right side view showing a part of a cover-material fixing tool according to a third embodiment of the present invention.

EMBODIMENTS OF INVENTION

Figure 5:
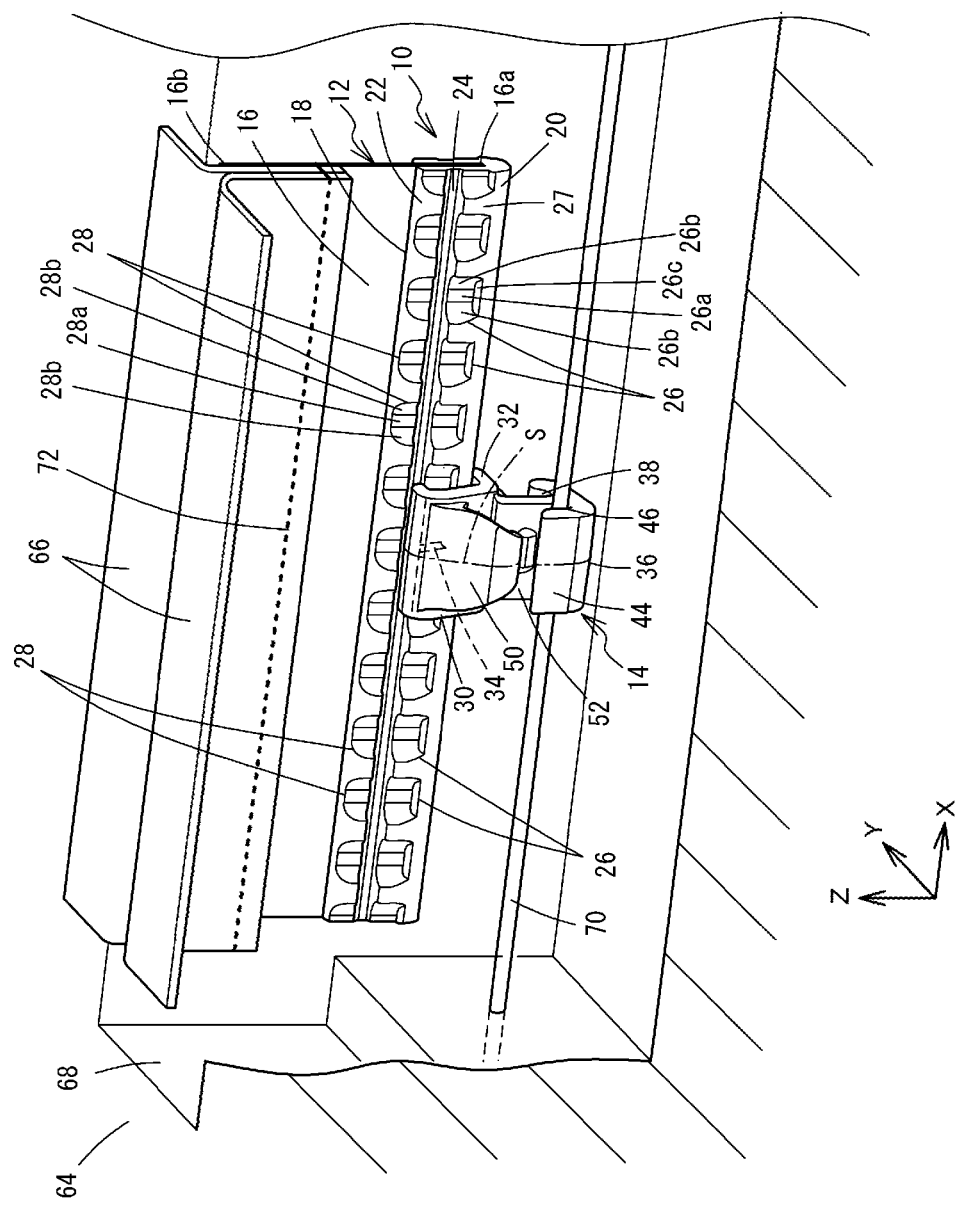
FIG. 5 is a perspective view showing a use state of the cover-material fixing tool according to the first embodiment of the present invention.
Figure 6A:
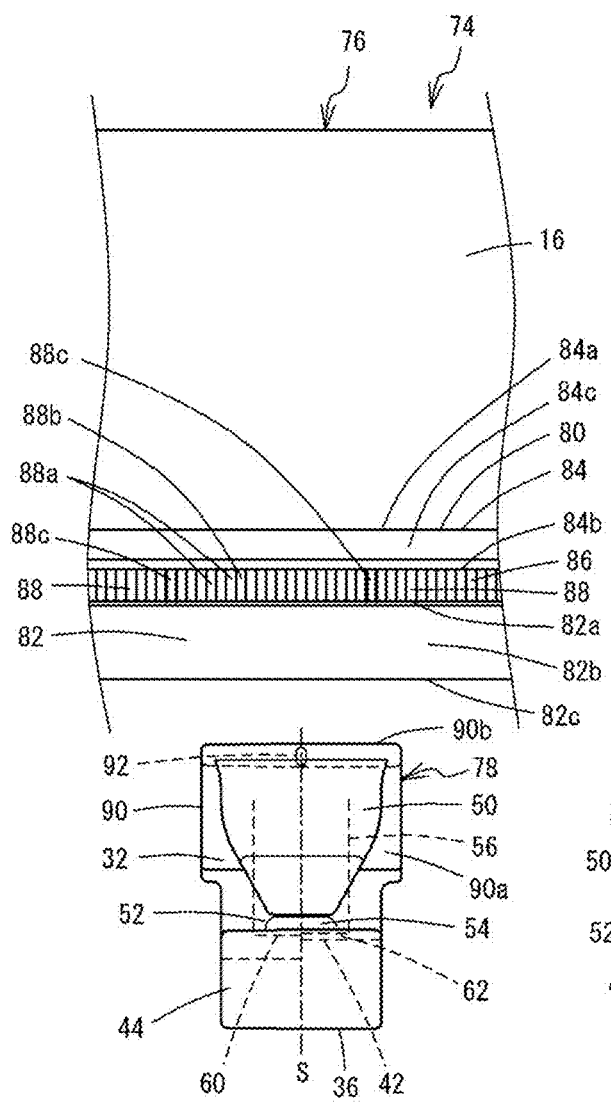
FIGS. 6A and 6B are respectively a front view and a right side view showing a part of a cover-material fixing tool according to a second embodiment of the present invention.
Figure 6B:
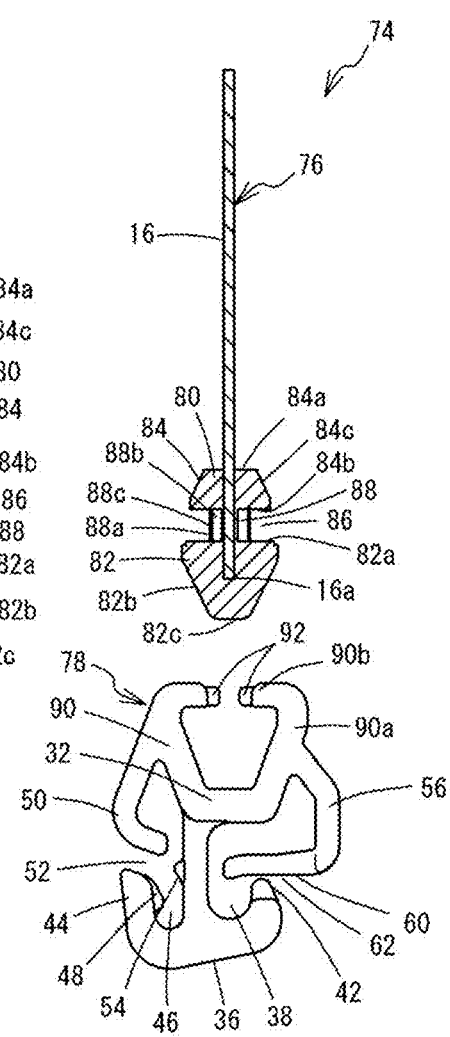
Figure 7:
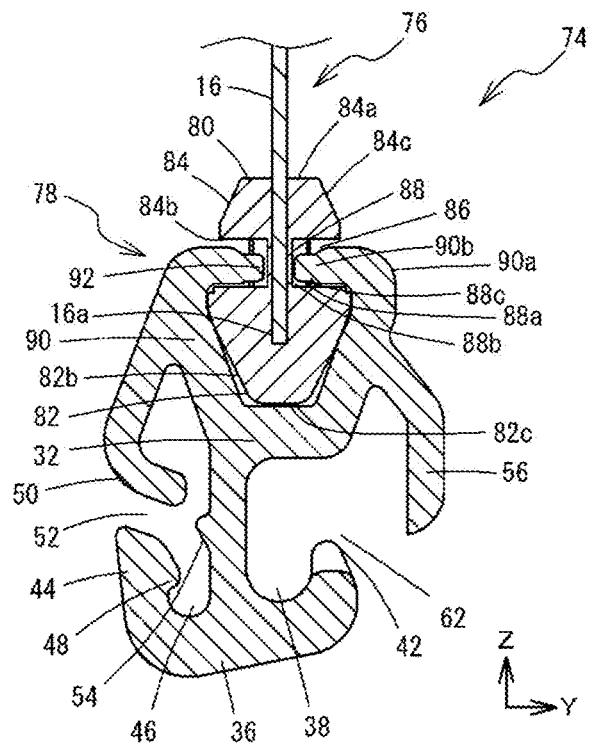
FIG. 7 is a longitudinal sectional view in an YZ plane of the cover-material fixing tool according to the second embodiment of the present invention.
Figure 8:
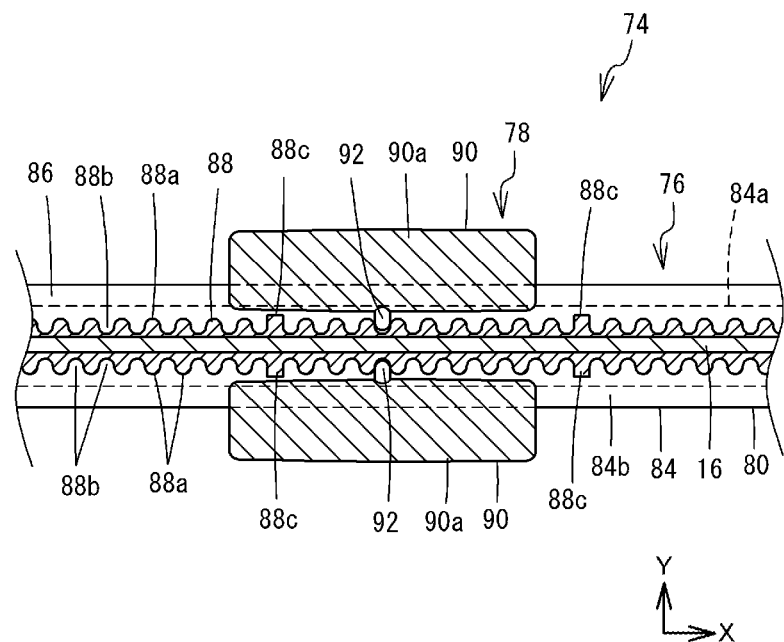
FIG. 8 is a transversal sectional view in a XY plane of the cover-material fixing tool according to the second embodiment of the present invention.
Figure 10:
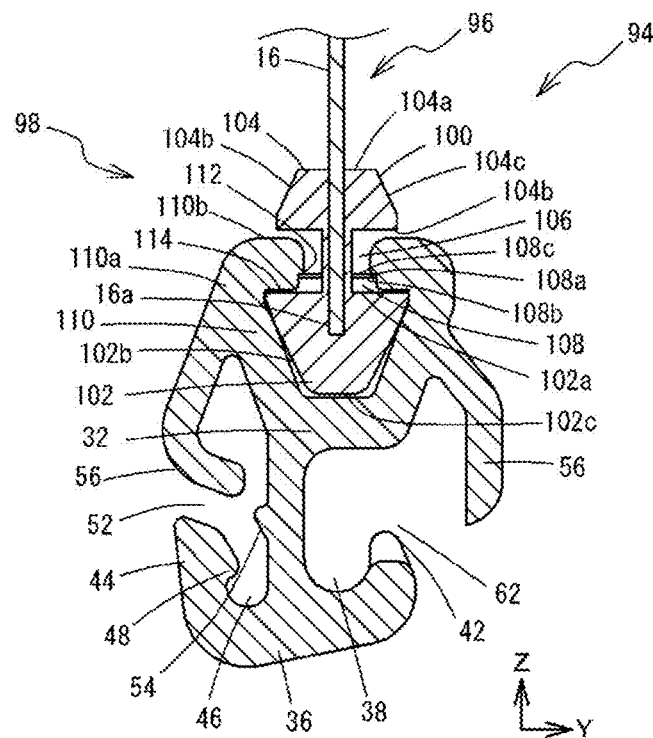
FIG. 10 is a longitudinal sectional view in an YZ plane of the cover-material fixing tool according to the second third embodiment of the present invention.
Figure 11:
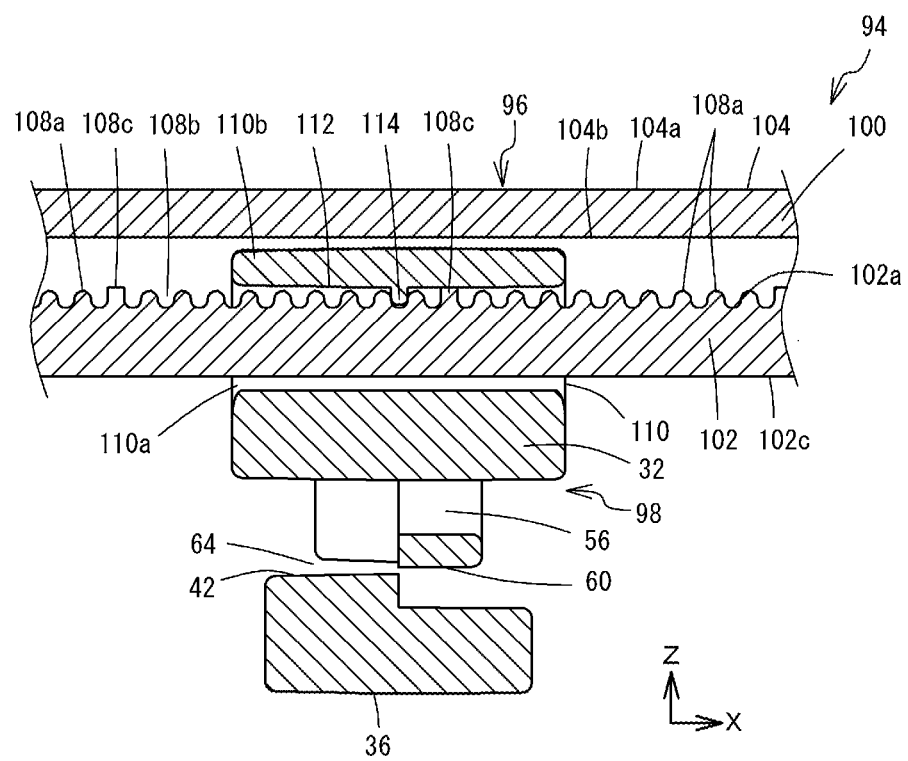
FIG. 11 is a longitudinal sectional view in a XZ plane of the cover-material fixing tool according to the second third embodiment of the present invention.
Figure 12:
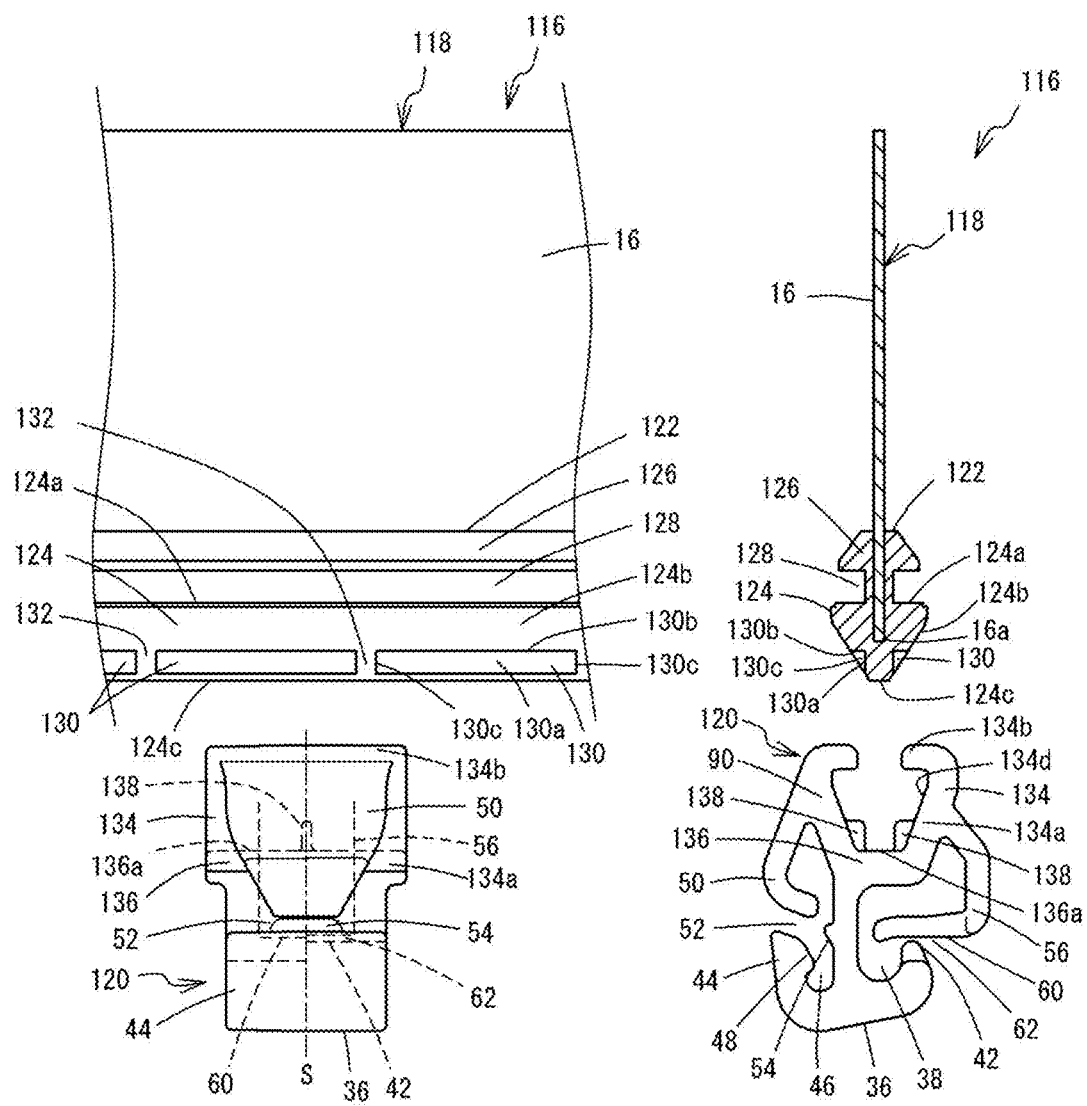
FIGS. 12A and 12B are respectively a front view and a right side view showing a part of a cover-material fixing tool according to a fourth embodiment of the present invention.
Figure 13:
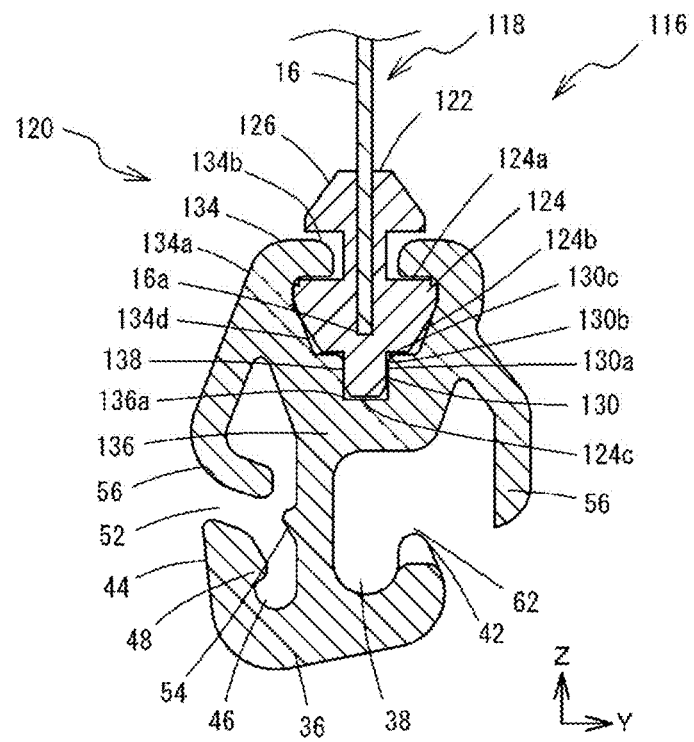
FIG. 13 is a longitudinal sectional view in an YZ plane of the cover-material fixing tool according to the fourth embodiment of the present invention.
Figure 14:
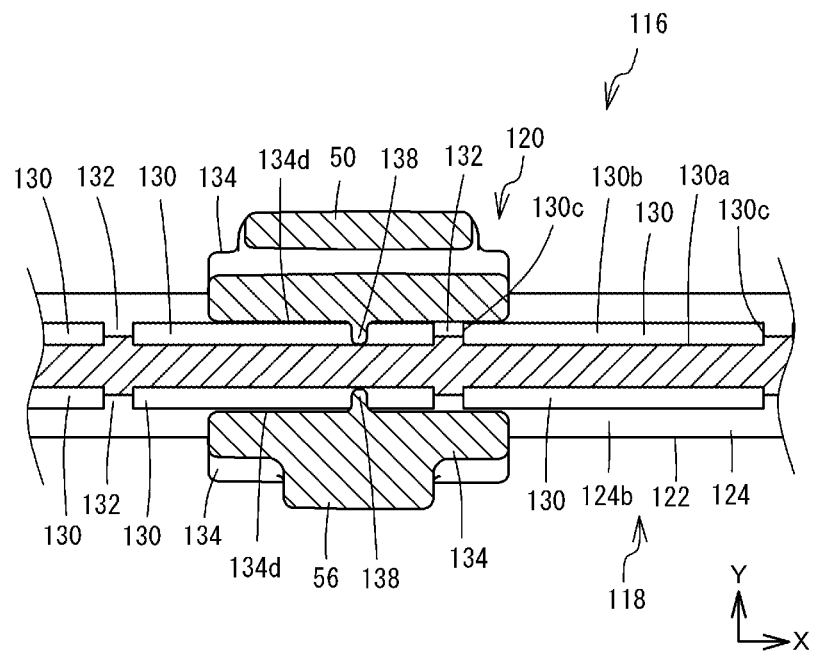
FIG. 14 is a transversal sectional view in a XY plane of the cover-material fixing tool according to the fourth embodiment of the present invention.

Hereinafter, embodiments of the present invention will be described with reference to the accompanying drawings. Meanwhile, for the description of a cover-material fixing tool 10, directions will be described with reference to XYZ axis directions perpendicular to each other as shown in FIG. 5. Herein, the X-axis direction is referred to as a forward and rearward direction and corresponds to a length direction of a wire 70 as a locked member arranged, for example, at a deep part of a groove 68 of a cushion material 64 as describe below, i.e., an inserting direction of the wire 70 which is inserted through the cushion material 64, and also to an direction along which an end edge of a cover-material 66 extends. Also, the X-axis direction corresponds to a direction along which an end edge of a clip locking member 18 of a cover-material fixing end member 12 as described below extends. A direction in which the clip locking member 18 is inserted into the groove 68 of the cushion 64 to be locked onto the wire 70 is referred to as an upward and downward direction. The upward and downward direction is the Z-axis direction perpendicular to the X-axis direction and corresponds to a depth direction of the cushion material 64. Also, the upward and downward direction corresponds to a direction normal to an outer surface of the cover-material 66, as described below, stretched on the cushion material 64. Further, a direction perpendicular to the X-axis direction, which is the forward and rearward direction, and the Z-axis direction, which is the upward and downward direction, is the Y-axis direction and is referred to as a right and left direction. A direction parallel to the right and left direction is also referred to as a lateral direction.

FIGS. 1A to 5 show a first embodiment of the present invention. The cover-material fixing tool 10 of the present embodiment includes a cover-material fixing end member 12 stitched on a cover-material 66 and a clip 14 detachably attached on the cover-material fixing end member 12.

First, the cover-material fixing end member 12 will be described. The cover-material fixing end member 12 is provided with a flexible tape member 16 made of cloth or the like, and the tape member 16 is an elongated band-shaped member. A clip locking member 18 is integrally provided on one side edge portion 16a of the tape member 16 along a longitudinal direction thereof. The clip locking member 18 is molded by synthetic resin and is continuously provided to have a constant cross-sectional shape along the longitudinal direction of the tape member 16. For example, the clip locking member 18 is mounted on the side edge portion 16a of the tape member 16 by insert-molding a thermoplastic resin therein. A cross-sectional shape of the clip locking member 18 in the YZ plane is axisymmetric about the center axis of the tape member 16 in the Z-axis direction, and is provided, along the longitudinal direction of the tape member 16, with a lower edge portion 20 covering the side edge portion 16a of the tape member 16, an upper edge portion 22 located above the lower edge portion 20, and groove portions 24 located between the lower edge portion 20 and the upper edge portion 22.

Figure 2A:
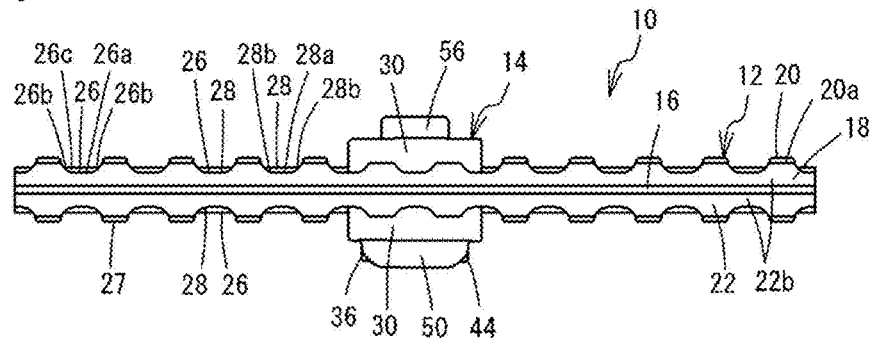
FIGS. 2A, 2B and 2C are respectively a plan view, a front view and a bottom view showing a part of the cover-material fixing tool according to the first embodiment of the present invention.
Figure 2B:
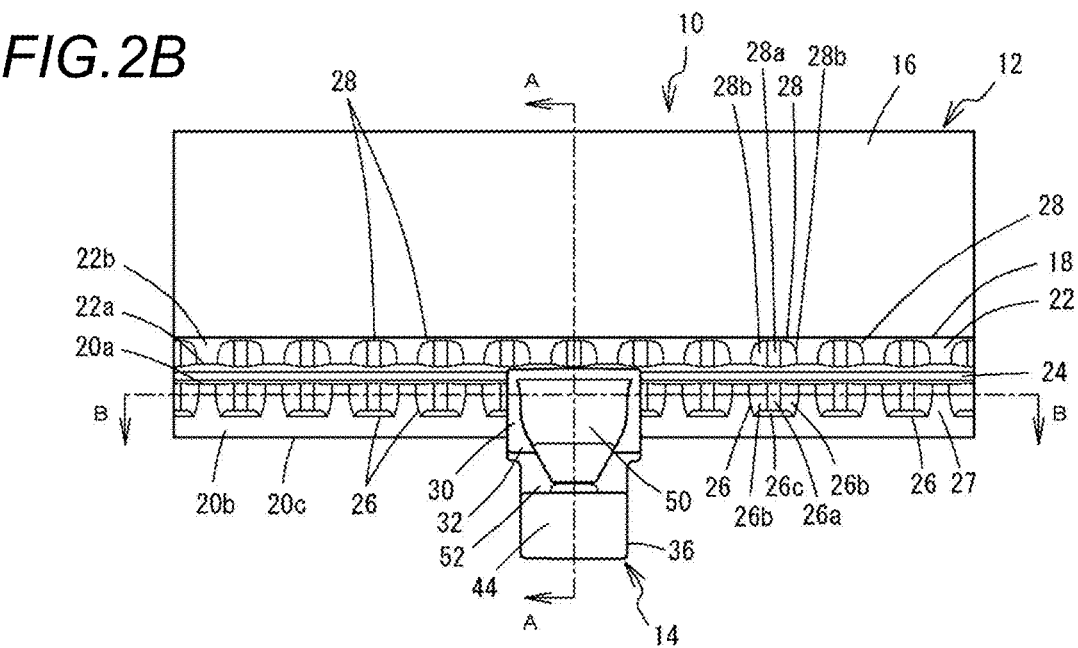
Figure 2C:
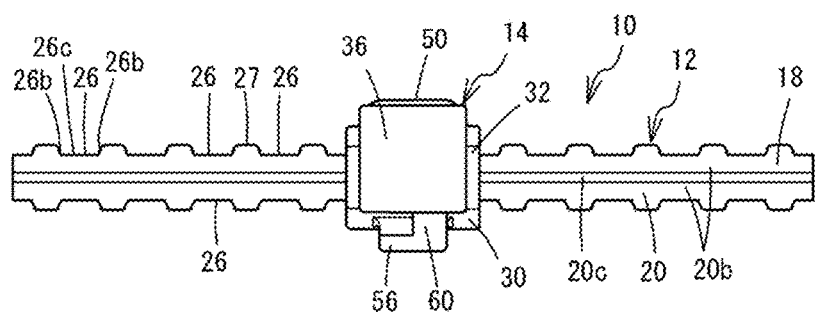
Figure 3:
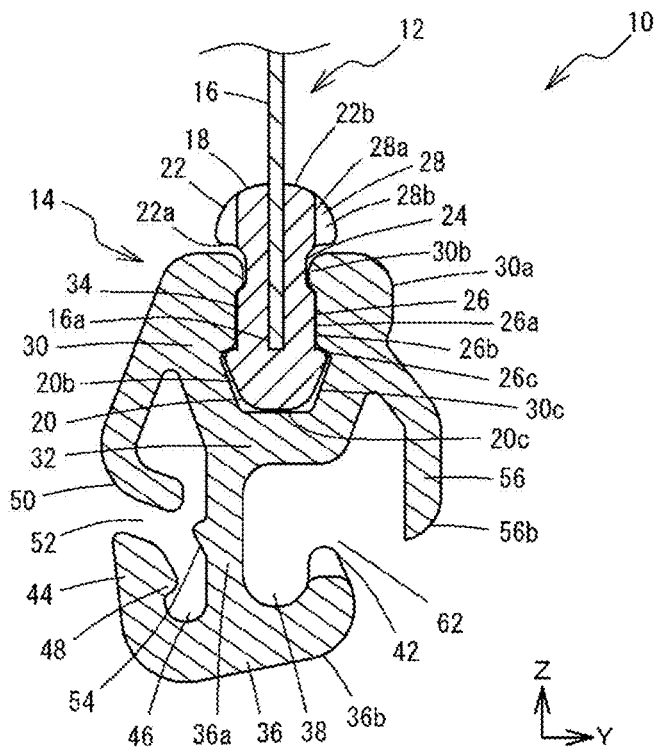
FIG. 3 is a longitudinal end view taken along a line A-A in FIG. 2B.
Figure 4:
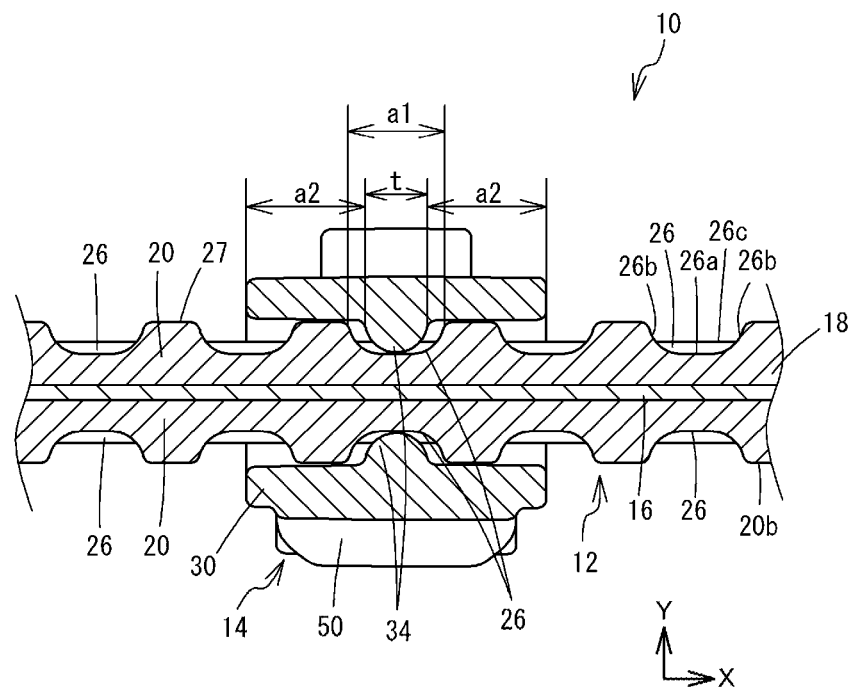
FIG. 4 is a transversal end view taken along a line B-B in FIG. 2B.

The lower edge portion 20 has a cross-sectional shape of a generally V-shape and is provided with an upper surface 20a protruding in the Y-axis direction (right and left direction) of the tape member 16, and inclined surfaces 20b inclined to extend downward from outer sides of the upper surface 20a while approaching each other. A lower end portion 20c as a corner portion, at which a pair of right and left inclined surfaces 20b join together, is chamfered to be rounded. On the lower edge portion 20, locking recess portions 26 having a certain shape are provided at equal intervals along the longitudinal direction. Each of the locking recess portions 26 is formed by a flat surface portion 26a extending from a middle of the inclined surface 20b to the upper surface 20a and located parallel to a side surface of the tape member 16, i.e., parallel to the XZ plane; side surface portions 26b continuous to both sides, in the X-axis direction (forward and rearward direction), of the flat surface portion 20a and gradually lowered to be continuous to the inclined surface 20b; and a lower surface portion 26c continuous to below the flat surface portion 26a and the side surface portions 26b and also continuous to the inclined surface 20b. As shown in FIG. 4, a depth of the flat surface portion 26a of the locking recess portion 26 is set to allow a locking protrusion 34, as described below, of the clip 14 to be inserted therein. Adjacent stoppers 27 have a contact surface with the locking protrusion 34, and the contact surface is inclined toward a distal end side of the stopper 27 in a protruding direction thereof so that the locking recess portion 26 is widened. Therefore, a relatively movable range of the clip 14 can be ensured between two contact surfaces between the stoppers 27 and the locking protrusion 34, and also a strength of the stoppers 27 can be set to a desired value. A length a1 of the locking recess portion 26 in the X-axis direction (forward and rearward direction) is provided to be longer than a length t (hereinafter, also referred to as a width t) of the locking protrusion 34 in the X-axis direction (forward and rearward direction), so that the movable region is provided. Thus, the clip 14 can be moved in the X-axis direction (forward and rearward direction) within a range of the locking recess portion 26. Specifically, if the length t is 1.5 mm and the length a1 is 6.5 mm, the movable range is 5.0 mm in the X-axis direction. Such length values are an example and thus the present invention is not limited to the example. Meanwhile, a part between a pair of the locking recess portions 26 is the stopper 27, on which the locking protrusion 34 of the clip 14 as described below is locked in a sliding direction thereof.

The upper edge portion 22 has a cross-sectional shape of a semicircle protruding to be curved upward and is formed by a lower surface 22a protruding in the Y-axis direction (right and left direction) of the tape member 16 and an upper surface 22b having a circular arch-shape curved upward. The upper edge portion 22 is provided with a bending recess portion 28 at a location thereon opposing the locking recess portion 26 of the lower edge portion 20. The bending recess portion 28 has a shape similar to that of the locking recess portion 26, and has a flat surface portion 28a extending from the lower surface 22a to a middle of the upper surface 22b and located parallel to the side surface of the tape member 16, i.e., parallel to the XZ plane; and side surface portions 28b continuous to both sides, in the X-axis direction (forward and rearward direction), of the flat surface portion 28a and also gradually lowered to be continuous to the upper surface 22b.

Each of the groove portions 24 located between the lower edge portion 20 and the upper edge portion 22 is provided to be slightly deeper than the locking recess portion 26 of the lower edge portion 20 and the bending recess portion 28 of the upper edge portion 22, and has a U shape surrounded by the upper surface 20a of the lower edge portion 20 and the lower surface 22a of the upper edge portion 22.

Next, the clip 14 to be attached on the cover-material fixing end member 12 will be described. The clip 14 is integrally molded by synthetic resin and has a pair of locking claws 30. Each of the locking claws 30 has an arm portion 30a formed to oppose each other. Base end portions of the arm portions 30a (also referred to as base end portions of the locking claws 30) are integrally formed from both sides of an upper surface 32a of a locking claw base portion 32 (also referred to as one surface of the locking claw base portion 32). The locking claws 30 are formed to protrude upward from the upper surface 32a, so that a distance therebetween in the right and left direction is widened as they go upward. A locking portion 33 is formed by the locking claws 30 and the locking claw base portion 32.

Distal end portions 30b of the locking claws 30 are bent inward, i.e., in such directions that the distal end portions 30b face and approach each other. Each of the distal end portions 30b has a locking surface 30c opposing the locking claw base portion 32 and configured to be locked on the clip locking member 18. The locking surface 30c is formed to be substantially parallel to the upper surface 32a of the locking claw base portion 32. The clip locking member 18 is received and locked in a space surrounded by the pair of locking claws 30 and the locking claw base material 32.

Locking protrusions 34 are respectively provided on opposing inner surfaces 30d of the arm portions 30a of the pair of locking claws 30. Each of the locking protrusions 34 is a ridge provided at a middle location of the respective locking claws 30 in a thickness thereof along the X-axis direction (forward and rearward direction) and has a length starting from the locking surface 30c of the respective locking claws 30 and reaching the middle of the inner surface 30d. A width t of the locking protrusions 34 in the thickness direction is substantially constant in the Z-axis direction (upward and downward direction). As shown in FIG. 4, a length obtained by adding a length a2 from an end portion of the locking claw 30 in the X-axis direction (forward and rearward direction) to the locking protrusion 34 and the width t of the locking protrusion 34 in the thickness direction is set to be longer than the length a1 of the locking recess portion 26 in the X-axis direction (forward and rearward direction). Therefore, when the locking protrusion 34 is positioned inside the locking recess portion 26 on one end portion side thereof while abutting against either of the front and rear side surface portions 26b of the locking recess portion 26, end portions of the locking claws 30 of the clip 14 in the X-axis direction (forward and rearward direction) do not oppose the locking recess portions 26, but are positioned on the stoppers 27, which remain uncut between the pair of locking recess portions 26, or outside of the stoppers 27. That is, a length of the movable region obtained by subtracting the width t from the length a1 is shorter than the length a2.

A hook 36 is provided on a lower surface 32b of the locking claw base portion 32 (also referred to as the other surface of the locking claw base portion 32) opposite to the upper surface 32a. The hook 36 has an extension portion 36a provided on one end of the lower surface 32b in a direction, in which the pair of locking claws 32 face each other, and extending downward to be substantially perpendicular to the lower surface 32b, and a claw-shaped portion 36b bent from a distal end of the extension portion 36a in a right direction in FIG. 1B and also inclined toward the locking portion 33. A distal end portion 36c of the claw-shaped portion 36b is bent toward the locking portion 33 and also is formed to be slightly thinned toward a tip thereof. A U-shaped groove portion surrounded by the extension portion 36a, the claw-shaped portion 36b and the distal end portion 36c is formed to extend in the X-axis direction and defines a wire holding space 38 in which a wire 70 as described below is to be inserted therethrough.

The clip 14 is configured such that the X-axis direction (forward and rearward direction) is a width direction thereof and also a shape thereof is generally substantially symmetric with respect to a center line S of the clip 14 in the width direction, and a shape of the hook 36 in the X-axis direction (forward and rearward direction) is formed to have a constant width slightly shorter than a width of the locking claws 30. The claw-shaped portion 36b of the hook 36 is formed in such a manner that in a portion thereof, which extends from the middle of the claw-shaped portion 36b in the protruding direction thereof to the distal end portion 36c, a left half thereof with respect to the center line S in FIG. 1A is cut out to a predetermine depth. The distal end portion 36c of the hook 36 is configured such that an outer surface of a right half thereof with respect to the center line S serves as a guide surface 42, which is configured to abut against the wire 70, which is a locked member as described below, and thus to guide the wire 70 into the wire holding space 38.

The distal end of the extension portion 36a of the hook 36 is provided with an operating portion 36g extending in a direction (left direction in FIG. 1B) opposite to the claw-shaped portion 36b. The operating portion 36g is provided to be inclined downward toward an end portion thereof opposite to the claw-shaped portion 36b, and the downward inclined end portion is provided with a jig receiving portion 44 for receiving a jig (not shown). The jig receiving portion 44 extends from a distal end portion of the operating portion 36g toward the locking claws 30 to be substantially parallel to the extension portion 36a with a space interposed therebetween, and a distal end portion 44a thereof reaches the vicinity of the middle of the extension portion 36a in a length direction thereof. A U-shaped groove portion surrounded by the extension portion 36a, the operating portion 36g and the jig receiving portion 44 defines a jig holding space 46 in which the jig (not shown) is to be inserted.

On an inner surface of the jig receiving portion 44 opposing the extension portion 36a, an engaging protrusion 48 is provided to be adjacent to the distal end portion 44a. Therefore, the engaging protrusion 48 is configured such that when the jig is inserted into the jig holding space 46, the jig can be engaged with the engaging protrusion 48 and thus be held in the jig holding space 46.

Among the pair of locking claws 30, a locking claw 30 on a side, on which the jig receiving portion 44 is formed, is provided with a jig guide piece 50 integrally formed with the locking claw 30. The jig guide piece 50 extends in an inclined direction extending downward as it goes away from the locking claw 30 and has a bent portion 50a provided in the vicinity of a lateral side of the lower surface 32b of the locking claw base portion 32. Thus, the jig guide piece 50 is bent toward the extension portion 36a of the hook 36 and then reaches the vicinity of the middle of the extension portion 36a. A gap between the distal end portion 44a of the jig receiving portion 44 and the jig guide piece 50 defines a jig insertion opening 52 through which the jig is to be inserted.

A jig holding protrusion 54 is provided at a location on the extension portion 36a of the hook 36 opposing the jig insertion opening 52, and also an inclined surface is provided to guide the jig, which is inserted in the jig insertion opening 52, toward the jig holding space 46.

Among the pair of locking claws 30, a locking claw 30 opposite to the locking claw 30 on the side, on which the jig guide piece 50 is formed, is provided with a wire guide piece 56 integrally formed with the locking claw 30. The wire guide piece 56 extends in an inclined direction extending downward as it goes away from the locking claw 30. The wire guide piece 56 has a first bent portion 56a provided in the vicinity of a lateral side of the lower surface 32b of the locking claw base portion 32, so that the wire guide piece 56 extends downward in a vertical direction to be parallel to the extension portion 36a of the hook 36. Also, the wire guide piece 56 has a second bent portion 56b provided at a location near to the middle of the extension portion 36a of the hook 36 and thus is bent at an angle of about 90°, so that the wire guide piece 56 extends to be substantially perpendicular to the length direction of the extension portion 36a and thus reaches the vicinity of the extension portion 36a.

A shape of the wire guide piece 56 in the X-axis direction is formed to have a constant width slightly shorter than the width of the locking claws 30 and also shorter than the width of the hook 36. A part of the wire guide piece 56, which extends from the second bent portion 56b to a distal end portion 56c thereof, is configured such that a right half thereof with respect to the center line S in FIG. 1A is cut out and the left half thereof forms an elastic piece portion 56d. A lower surface of the elastic piece portion 56d is a guide surface 60 as described below.

The elastic piece portion 56d of the wire guide piece 56 and the distal end portion 36c of the hook 36 are provided to be spaced from each other along an inserting direction of the wire 70, i.e., a direction parallel to the X-axis direction. Here, the term 'spaced' means a state where their positions are offset in the X-axis direction (forward and rearward direction) and also a state where, when one side is projected in a direction perpendicular to the X-axis direction (forward and rearward direction), the one side is likely to be in contact with the other side, but does not overlap therewith. The wire guide piece 56 and the hook 36 are provided to coincide with the X-axis direction at the vicinity of their base end portions. However, the distal end portion 56c of the wire guide piece 56 is cut out in the right half thereof in FIG. 1A and the distal end portion 36c of the hook 36 is cut out in the left half thereof, so that their distal end portions are spaced from each other and positioned in a staggered manner.

A gap between the wire guide piece 56 and the hook 36 defines a wire insertion opening 62 configured to allow the wire 70 to be inserted therethrough. The wire insertion opening 62 is configured such that a part thereof in the vicinity of the center line S of the clip 14 in the X-axis direction is narrowest and has a gap smaller than a diameter of the wire 70, thereby preventing the wire 70 from falling out after being inserted therethrough and thus reliably holding the wire 70 in the wire holding space 38.

A lower surface of the wire guide piece 56 forms the guide surface 60 facing the wire insertion opening 62. An outer surface of the distal end portion 36c of the claw-shaped portion 36b also forms a guide surface 42 facing the wire insertion opening 62. The guide surfaces 42, 60 are configured such that a distance therebetween are gradually narrowed toward the wire insertion opening 62, thereby defining a lead-in passage having a triangle leg shape. Also, the distal end portion 56c of the wire guide piece 56 is positioned toward the extension portion 36a beyond the distal end portion 36c of the hook 36 and also above the wire holding space 38. As such, it is possible to smoothly guide the wire 70 into the wire holding space 38 when the wire 70 is inserted therein.

Next, a method of using the cover-material fixing tool 10 of the present embodiment will be described with reference to FIGS. 1A, 1B and 5. As shown in FIG. 5, the cover-material fixing tool 10 is used to stretch a cover-material 66 at a predetermined location on a surface of a cushion material 64 for a vehicle seat. Here, the cushion material 64 and the cover-material 66 will be described. The cushion material 64 is a synthetic resin foam material, such as urethane foam, molded into a seat shape. The cushion material 64 has a groove 68 formed to allow the cover-material to be fixed therein, and the wire 70 is installed in the groove 68. The wire 70 is a wire material made of metal and can be incorporated into the cushion material 64 by insert-molding during molding of the cushion material 64.

The cover-material 66 is a leather, cloth or synthetic leather sheet or the like for covering the surface of the cushion material 64 and has a stitched portion 72 at a site thereof corresponding to the groove 68 of the cushion material 64. The stitched portion 72 is formed by aligning end edges of a pair of cover-materials 66 with each other while surfaces thereof face each other, overlapping the tape member 16 of the cover-material fixing end member 12 with the aligned end edges and then stitching them together. The tape member 16 is stitched at a side edge portion 16b thereof opposite to the side edge portion 16a, on which the clip locking member 18 is provided, the side edge portion 16a protrudes laterally from the end edges of the cover-materials 66, and the clip locking member 18 is positioned on a back surface side of the cover-materials 66.

When the cover-material 66 is stretched on the cushion material 64, the clip 14 is first attached at a predetermined location on the clip locking member 18 of the cover-material fixing end member 12 attached to the cover-material 66. A plurality of clips 14 are attached along the longitudinal direction of the clip locking member 18 at predetermined intervals. When the lower edge portion 20 of the clip locking member 18 is pressed in between the pair of locking claws 30, the pair of locking claws 30 are elastically deformed and widened and thus the lower edge portion 20 passes therebetween. Once the lower edge portion 20 passes therebetween, the elastic deformation of the locking claws 30 is restored and thus the distal end portions 30b of the pair of locking claws 30 are inserted into the respective groove portions 24 of the clip locking member 18. Then, the lower edge portion 20 is fitted between the pair of locking claws 30 and thus does not fall out therefrom. In this state, the extension portion 36a of the hook 36 of the clip 14 protrudes downward to be perpendicular to the longitudinal direction of the clip locking member 18. The locking protrusions 34 of the locking claws 30 are inserted in the locking recess portions 26 of the clip locking member 18, and thus the clip 14 is locked within a predetermined range without largely moving in the longitudinal direction of the clip locking member 18. Since the width a1 of the locking recess portion 26 is larger than the width t of the locking protrusion 34, the clip 14 can be moved within a range of the movable region (a1-t). Since the movable region (a1-t) is shorter than the length a2 between the end portion of the stopper locking protrusion 34 and the end portion of the locking claw 30, the locking claws 30 are prevented from falling into the respective locking recess portions 26 and thus being inclined, even if the clip 14 is positioned at any locations within the range of the movable region.

Subsequently, the stitched portion 72 of the cover-material 66, to which the clips 14 are attached, is arranged to coincide with the groove 68 of the corresponding cushion material 64, and then the hook 36 of each of the clips 14 is pressed against the wire 70 by a finger or the like. At this time, it is preferable to move the clip 14 in the Y-axis direction (right and left direction) in order to cause the wire 70 to coincide with the wire insertion opening 62. In this state, if the clip 14 is further pressed in, the wire 70 is guided along the claw-shaped portion 36b and thus is led in between the guide surfaces 42, 60 extending toward the wire insertion opening 62. When the clip 14 is further pressed to be inserted into the groove 68 of the cushion material 64, the wire 70 is positioned in the lead-in passage defined by the guide surfaces 42, 60 extending toward the wire insertion opening 62 and then is led into the wire insertion opening 62.

Since the wire insertion opening 62 is configured so that the narrowest width thereof on the center line S is smaller than a diameter of the wire 70, the wire insertion opening 62 does not allow the wire 70 to pass therethrough as it is. However, in this state, if the clip 14 is further pressed from above, the wire guide piece 56 is elastically deformed so that the wire insertion opening 62 becomes wider than the diameter of the wire 70. As a result, the wire 70 enters the wire holding space 38 through the wire insertion opening 62. At this time, the wire 70 hits against the extension portion 36a due to a momentum thereof upon passing, and after the wire 70 passes through the wire insertion opening 62, the elastic deformation of the wire guide piece 56 is restored, thereby generating a click feeling. The wire insertion opening 62 is restored such that the width thereof becomes narrower than the wire 70, thereby preventing the wire 70 from falling out. In this way, the clips 14 are locked on the wire 70, and the cover-materials 66 attached to the cover-material fixing tool 10 are attached on the surface of the cushion material 64 with the end edges thereof inserted in the groove 68.

On the other hand, when the clip 14 of the cover-material fixing tool 10 is separated from the wire 70, a long rod-shaped jig (not shown) is used. The jig is provided with a locking portion at a distal end thereof, and the locking portion is inserted and pressed into a gap of a jig insertion opening 52 between the jig guide piece 50 and the jig receiving portion 44. Then, the locking portion on the distal end of the jig abuts against an engaging protrusion 48 of the jig receiving portion 44, and if the locking portion is further pressed in, the jig receiving portion 44 is elastically deformed and widened. If the locking portion of the jig passes therethrough, the shape of the jig receiving portion 44 is restored such that the locking portion is put in the jig holding space 46 below the engaging protrusion 48 and cannot exit therefrom. Also, when the locking portion of the jig passes through the jig insertion opening 52, the locking portion is guided by a jig holding protrusion 54 while being in contact therewith, thereby causing the locking portion to reliably enter the jig holding space 46.

Subsequently, if the jig is drawn up, a moment is exerted on the clip 14 so that the clip 14 is rotated about the wire 70. Then, the wire 70 is guided by the distal end portion 36c of the claw-shaped portion 36b of the hook 36 and the distal end portion 56c of the wire guide piece 56 and thus is positioned in the wire insertion opening 62. In this state, when the clip 14 is further drawn up, the wire 70 hits against the vicinity of the distal end portion 56c of the wire guide piece 56 so that the distal end portion 56c is elastically deformed, thereby widening the wire insertion opening 62. Eventually, the wire 70 passes through the widened wire insertion opening 62. In this way, the cover-material fixing tool 10 is separated from the wire 70 and thus the cover-material 66 can be also separated from the cushion material 64.

According to the cover-material fixing tool 10 of the present embodiment, the cover-material 66 can be hooked on the wire in the cushion material 64 by a simple operation, thereby providing a good operability. Also, a position of the clip 14 attached on the cover-material 66 can be moved within the range of the movable region along the clip locking member 18 of the cover-material fixing end member 12 in order to adjust the position. Even if the cover-material 66 does not conform to a shape of the cushion material 64 due to deviations occurring upon cutting or stitching of the cover-material 66, an internal stress therein can be released by moving the clip 140. As a result, wrinkles do not occur on the cover-material 66 so that the cover-material 66 can be flatly covered on the surface of the cushion material 64 and thus can be neatly finished. Therefore, it is possible to make a chair or a seat have a good external appearance. Also, since the locking recess portions 26 and the bending recess portions 28 are evenly formed in the clip locking member 18 at equal intervals along the longitudinal direction, the cover-material fixing end member 12 attached on the cover-material 66 has an increased flexibility. Therefore, the cover-material fixing end member 12 can be easily bent in the XY plane, thereby facilitating an attaching operation thereof to the wire 70. Also, it is possible to deform the cover-material fixing end member 12 to conform to an unevenness shape of the cushion material 64. As a result, since wrinkles or unevenness does not occur, a good external appearance can be obtained. The locking protrusions 34 of the clip 14 are reliably fitted in the locking recess portions 26 while setting aside the movable region and also do not fall out therefrom. Also, the locking protrusions 34 are not largely moved beyond the movable region even if a strong force is exerted thereon. Even if a strong force is exerted on the clip 14 when the clip 14 is attached on or detached from the wire 70, the clip 14 does not be largely moved, thereby facilitating an attaching or detaching operation thereof. Further, since the length obtained by adding the length a2 from the end portion of the locking claw 30 in the X-axis direction (forward and rearward direction) to the locking protrusion 34 and the width t of the locking protrusion 34 in the thickness direction is set to be longer than the length a1 of the locking recess portion 26 in the X-axis direction (forward and rearward direction), the locking claw 30 of the clip 40 is prevented from entering the locking recess portion 26 and thus being inclined, even if the clip 14 is positioned on an end portion of the locking recess portion 26. Therefore, it is possible to securely attaching the clip 14 to the cover-material fixing end member 12 without reducing an attaching strength or stability thereto.

Also, when the clip 14 is inserted into the groove 68 of the cushion material 64 by pressing the jig receiving portion 44 while holding the clip 14 by a finger, the entire clip 14 is likely to be inclined so that the clip 14 is pressed down against a force pulled by the cover-material 66. However, the wire insertion opening 62 is oriented downward and also the triangle leg-shaped lead-in passage defined by the guide surfaces 42, 60 facing the wire insertion opening 62 is formed to be flared downward. Accordingly, even in the inclined state, the clip 14 can be easily locked on the wire 70 only by pressing the clip 14 against the wire 70 generally in the vicinity of the wire insertion opening 62. Also, since it is unnecessary to precisely position the clip 14, the clips 14 can be simply operated within the groove 68 of the cushion material 64 and thus the operation does not require skills so that the clip 14 can be simply attached by any persons. Further, the clip 14 can be separated from the wire 70 by a simple operation using the jig, and thus a work efficiency upon separation thereof is also good.

Next, a second embodiment of the present invention will be described with reference to FIGS. 6A to 8. Herein, the same members as those of the foregoing embodiments are denoted by the same reference numerals and the descriptions thereof will be omitted. The cover-material fixing tool 74 of the present embodiment includes a cover-material fixing end member 76 stitched on a cover-material 66 and a clip 78 removably attached on the cover-material fixing end member 76.

First, the cover-material fixing end member 76 will be described. The cover-material fixing end member 76 is provided with a flexible tape member 16, and a clip locking member 80 is integrally provided on one side edge portion 16a of the tape member 16. For example, the clip locking member 80 is mounted on the side edge portion 16a of the tape member 16 by insert-molding. A cross-sectional shape of the clip locking member 80 in the YZ plane is axisymmetric about the center axis of the tape member 16 in the Z-axis direction, and is provided, along the longitudinal direction of the tape member 16, with a lower edge portion 82 covering the side edge portion 16a of the tape member 16, an upper edge portion 84 located above the lower edge portion 82, and groove portions 86 located between the lower edge portion 82 and the upper edge portion 84.

The lower edge portion 82 has a cross-sectional shape of a generally V-shape and is provided with an upper surface 82a protruding in the Y-axis direction (right and left direction) of the tape member 16, and inclined surfaces 82b inclined to extend downward from outer sides of the upper surface 82a while approaching each other. A lower edge portion 82c as a corner portion, at which a pair of right and left inclined surfaces 82b join together, is chamfered to be rounded.

The upper edge portion 84 has a trapezoidal cross-sectional shape and is provided with an upper base 84a protruding in the right and left direction, a lower base 84b located below the upper base 84a, and side surfaces 84c connecting the upper base 84a with the lower base 84b.

Each of the groove portions 86 located between the lower edge portion 82 and the upper edge portion 84 has a U shape surrounded by the upper surface 82a of the lower edge portion 82, the lower base 84b of the upper edge portion 84 and a side surface wall portion 88, which is located parallel to a side surface of the tape member 16, i.e., parallel to the XZ plane and on which a locking protrusion 92 of the clip 78 as described below is locked. On the side surface wall portion 88, a plurality of ridges 88a extending along the Z-axis direction (upward and downward direction) are provided in a continuous waveform along the X-axis direction (forward and rearward direction). A cross-sectional shape of an apex portion of each of the ridges 88a in the XY plane is semicircular and a cross-sectional shape of a valley portion 88b between the ridges 88a is a U shape. Stoppers 88c are provided at a rate of one per the predetermined number of ridges 88a of the plurality of consecutive ridges 88a. Each of the stoppers 88c is a ridge having the same width as that of the ridges 88a, and an apex portion thereof further protrudes in the Y-axis direction (right and left direction) than the ridges 88a and has a rectangular cross-sectional shape in the XY plane.

Next, the clip 78 to be attached on the cover-material fixing end member 76 will be described. The clip 78 has a pair of locking claws 90. The locking claws 90 have respective arm portions 90a formed to oppose each other, and distal end portions 90b thereof are bent inward, i.e., in such directions that the distal end portions 90b face and approach each other. Each of a pair of distal end portions 90b is provided with a locking protrusion 92 at the middle thereof in the X-axis direction (forward and rearward direction). The locking protrusion 92 is a ridge having a size fitted into the valley portion 88b between the ridges 88a on the side surface wall portion 88 of the cover-material fixing end member 76, and a cross sectional shape thereof in the XZ plane is a circular shape elongated in the upward and downward direction. Also, the locking protrusion 92 protrudes by a predetermined length in the Y-direction. The protruding length is set to allow the pair of locking protrusions 92 to be inserted and locked in a pair of valley portions 88b from both sides of the tape member 16 of the cover-material fixing end member 76. An apex portion of the locking protrusions 92 is formed to have a rounded corner.

Next, a method of using the cover-material fixing tool 74 of the present embodiment will be described. First, the clip 78 is attached at any location on the clip locking member 80 of the cover-material fixing end member 76 of the cover-material fixing tool 74 stitched on the cover-material 66. A plurality of clips 78 are attached along the longitudinal direction of the clip locking member 80 at predetermined intervals. When the lower edge portion 82 of the clip locking member 80 is pressed in between the pair of locking claws 90, the pair of locking claws 90 are elastically deformed and widened and thus the lower edge portion 82 passes therebetween. Once the lower edge portion 82 passes therebetween, the elastic deformation of the locking claws 90 is restored and thus the distal end portions 90b of the pair of locking claws 90 are inserted into the respective groove portions 86 of the clip locking member 80. Then, the lower edge portion 82 is fitted between the pair of locking claws 90 and thus does not fall out therefrom. In this state, the locking protrusions 92 of the locking claws 90 abut against the side surface wall portions 88 of the groove portions 86 and thus are inserted and locked in the valley portions 88b. Accordingly, the locking protrusions 92 are locked so as not to move in the X-axis direction (forward and rearward direction) of the groove portions 86. Meanwhile, the apex portion of the locking protrusions 92 is formed to have a rounded corner and the apex portion of the ridges 88a has a semicircular shape. Accordingly, if a strong force is exerted on the clip 78 in the X-axis direction, the locking claws 90 or locking protrusions 92 of the clip 78 are elastically deformed and move over the ridges 88a. When the locking protrusions 92 are inserted into the adjacent valley portion 88b, a click feeling is generated and movement thereof is similar to that of a ratchet. However, the locking protrusions 92 cannot move over the stopper 88 and thus are stopped at a location abutting against the stopper 88. Therefore, the clip 78 can move within a predetermined length between a pair of stoppers 88c.

The cover-material fixing tool 74 of the present embodiment is used by an operation similar to those of the foregoing embodiment and has effects similar thereto. The clip 78 can move between the pair of stoppers 88c of the clip locking member 80. Thus, an internal stress in the cover-material 66 after fixing thereof can be released by moving the clip 78. As a result, wrinkles do not occur on the cover-material 66 so that the cover-material 66 can be flatly covered on the surface of the cushion material 64 and thus can be neatly finished. Since the clip 78 cannot move beyond the distance between the pair of stoppers 88c, the clip 78 does not be largely moved even if a strong force is exerted on the clip 78 when the clip 78 is attached on or detached from the wire 70, thereby facilitating an attaching or detaching operation thereof. The clip 78 is locked on the ridges 88a so as not to move even between the pair of stoppers 88c if a force smaller than a certain degree is exerted thereon, thereby further facilitating the attaching or detaching operation. By changing a height or shape of the ridges 88a, a resistance to movement can be arbitrarily set.

Next, a third embodiment of the present invention will be described with reference to FIGS. 9A to 11. Herein, the same members as those of the foregoing embodiments are denoted by the same reference numerals and the descriptions thereof will be omitted. The cover-material fixing tool 94 of the present embodiment includes a cover-material fixing end member 96 stitched on a cover-material 66 and a clip 98 removably attached on the cover-material fixing end member 96.

First, the cover-material fixing end member 96 will be described. The cover-material fixing end member 96 is provided with a flexible tape member 16, and a clip locking member 100 is integrally provided on one side edge portion 16a of the tape member 16.

A cross-sectional shape of the clip locking member 100 in the YZ plane is axisymmetric about the center axis of the tape member 16 in the Z-axis direction, and is provided, along the longitudinal direction of the tape member 16, with a lower edge portion 102 covering the side edge portion 16a of the tape member 16, an upper edge portion 104 located above the lower edge portion 102, and groove portions 106 located between the lower edge portion 102 and the upper edge portion 104.

The lower edge portion 102 has a cross-sectional shape of a generally V-shape and is provided with an upper surface 102a protruding in the Y-axis direction (right and left direction) of the tape member 16, and inclined surfaces 102b inclined to extend downward from outer sides of the upper surface 102a while approaching each other. A lower edge portion 102c as a corner portion, at which a pair of right and left inclined surfaces 102b join together, is chamfered to be rounded.

The upper edge portion 104 has a trapezoidal cross-sectional shape and is provided with an upper base 104a protruding in the right and left direction, a lower base 104b located below the upper base 104a and side surfaces 104c connecting the upper base 104a with the lower base 104b.

Each of the groove portions 106 located between the lower edge portion 102 and the upper edge portion 104 has a U shape surround by the upper surface 102a of the lower edge portion 102, the lower base 104b of the upper edge portion 104, and a flat surface portion 106a connecting the upper surface 102a with the upper base 104a. On the upper surface 102a, a plurality of ridges 108 extending along the Y-axis direction (right and left direction) is provided in a continuous waveform along the X-axis direction (forward and rearward direction). A cross-sectional shape of an apex portion of each of the ridges 108 in the XY plane is semicircular and a cross-sectional shape of a valley portion 108b between the ridges 108 is a U shape. Stoppers 108c are provided at a rate of one per the predetermined number of ridges 108 of the plurality of consecutive ridges 108. Each of the stoppers 108c is a ridge having the same width as that of the ridges 108, and an apex portion thereof further protrudes in the Z-axis direction (upward direction) than the ridges 108 and has a rectangular cross-sectional shape in the XZ plane.

Next, the clip 98 to be attached on the cover-material fixing end member 96 will be described. The clip 98 has a pair of locking claws 110. The locking claws 110 have respective arm portions 110a formed to oppose each other, and distal end portions 110b thereof are bent inward, i.e., in such directions that the distal end portions 110b face and approach each other. Each of the distal end portions 110b has a locking surface 110c opposing the locking claw base portion 32 and also opposing the upper surface 102a of the lower edge portion 102 of the clip locking member 100. The locking surface 110c is formed to be substantially parallel to the upper surface 32a of the locking claw base portion 32. Each of a pair of locking surfaces 110c is provided with a locking protrusion 114 at the middle thereof in the X-axis direction (forward and rearward direction). The locking protrusion 114 is a ridge having a size fitted into the valley portion 108b between the ridges 108 on the upper surface 102a of the lower edge portion 102 of the cover-material fixing end member 96, and a cross sectional shape thereof in the XZ plane is a semicircular shape at a lower end thereof. Further, the locking protrusion 114, which is also a ridge formed along the Y-axis direction, is formed over substantially the entire length of the locking surface 110c.

Next, a method of using the cover-material fixing tool 94 of the present embodiment will be described. First, the clip 98 is attached at any location on the clip locking member 100 of the cover-material fixing end member 96 of the cover-material fixing tool 94 stitched on the cover-material 66. A plurality of clips 98 are attached along the longitudinal direction of the clip locking member 100 at predetermined intervals. When the lower edge portion 102 of the clip locking member 100 is pressed in between the pair of locking claws 110, the pair of locking claws 110 are elastically deformed and widened and thus the lower edge portion 102 passes therebetween. Once the lower edge portion 102 passes therebetween, the elastic deformation of the locking claws 110 is restored and thus the distal end portions 110b of the pair of locking claws 110 are inserted into the respective groove portions 106 of the clip locking member 100. Then, the lower edge portion 102 is fitted between the pair of locking claws 110 and thus does not fall out therefrom. In this state, the locking protrusions 114 of the locking claws 110 abut against the upper surface 102a of the lower edge portion 102, which defines one surface of the groove portions 106, and thus are inserted and locked in the valley portions 108b. Accordingly, the locking protrusions 114 are locked so as not to move in the X-axis direction (forward and rearward direction) of the groove portions 106. Meanwhile, the apex portion of the locking protrusions 114 is formed to have a rounded corner and the apex portion of the ridges 108 has a semicircular shape. Accordingly, if a strong force is exerted on the clip 98 in the X-axis direction (forward and rearward direction), the locking claws 110 or locking protrusions 114 of the clip 98 are elastically deformed and move over the ridges 108. When the locking protrusions 114 are inserted into the adjacent valley portion 108b, a click feeling is generated and movement thereof is similar to that of a ratchet. However, the locking protrusions 92 cannot move over the stopper 108c and thus are stopped at a location abutting against the stopper 108c. Therefore, the clip 98 can move within a predetermined length between a pair of stoppers 88c.

The cover-material fixing tool 94 of the present embodiment is used by an operation similar to those of the foregoing embodiment and has effects similar thereto. The clip 98 can move between the pair of stoppers 108c of the clip locking member 100. Thus, an internal stress can be released by moving the clip 98. As a result, wrinkles do not occur on the cover-material 66 so that the cover-material 66 can be flatly covered on the surface of the cushion material 64 and thus can be neatly finished. Since the clip 98 cannot move beyond the distance between the pair of stoppers 108c, the clip 98 does not be largely moved even if a strong force is exerted on the clip 98 when the clip 98 is attached on or detached from the wire 70, thereby facilitating an attaching or detaching operation thereof. The clip 98 is locked on the ridges 108 so as not to move even between the pair of stoppers 108c if a force smaller than a certain degree is exerted thereon, thereby further facilitating the attaching or detaching operation. By changing a height or shape of the ridges 108, a resistance to movement can be arbitrarily set.

Next, a fourth embodiment of the present invention will be described with reference to FIGS. 12A to 14. Herein, the same members as those of the foregoing embodiments are denoted by the same reference numerals and the descriptions thereof will be omitted. The cover-material fixing tool 116 of the present embodiment includes a cover-material fixing end member 118 stitched on a cover-material 66 and a clip 120 removably attached on the cover-material fixing end member 118.

First, the cover-material fixing end member 118 will be described. The cover-material fixing end member 118 is provided with a flexible tape member 16, and a clip locking member 122 is integrally provided on one side edge portion 16a of the tape member 16. A cross-sectional shape of the clip locking member 122 in the YZ plane is axisymmetric about the center axis of the tape member 16 in the Z-axis direction, and is provided, along the longitudinal direction of the tape member 16, with a lower edge portion 124 covering the side edge portion 16a of the tape member 16, an upper edge portion 126 located above the lower edge portion 124, and groove portions 128 located between the lower edge portion 124 and the upper edge portion 126.

The lower edge portion 124 has a cross-sectional shape of a generally V-shape and is provided with an upper surface 124a protruding in the Y-axis direction (right and left direction) of the tape member 16, and inclined surfaces 124b inclined to extend downward from outer sides of the upper surface 124a while approaching each other. A lower edge portion 124c as a corner portion, at which a pair of right and left inclined surfaces 102b join together, is chamfered to be rounded. Each of the inclined surfaces 124b is provided with a locking recess portion 130 at a location thereon closer to the lower edge portion 124c than the upper surface 124a. The locking recess portion 130 has a groove shape elongated in the X-axis direction (forward and rearward direction) and is formed by a flat surface portion 130a located parallel to a side surface of the tape member 16, i.e., parallel to the XZ plane; an upper surface portion 130b extending from an upper edge of the flat surface portion 130 at a right angle and also continuous to the inclined surface 124b; and side surface portions 130c continuous to both sides of the flat surface portion 130a and the upper surface portion 130b at a right angle. A plurality of locking recess portions 130 having the same shape are provided in a row at predetermined intervals along the X-axis direction (forward and rearward direction). A part between a pair of locking recess portions 130 defines a stopper 132.

Next, the clip 120 to be attached on the cover-material fixing end member 118 will be described. The clip 120 has a pair of locking claws 134. The locking claws 134 have respective arm portions 134a formed to oppose each other, and distal end portions 134b thereof are bent inward, i.e., in such directions that the distal end portions 134b face and approach each other. Base end portions of the arm portions 134a (also referred to as base end portions of the locking claws 134) are integrally formed from both sides of an upper surface 136a of a locking claw base portion 136 (also referred to as one surface of the locking claw base portion 136). The locking claws 134 are formed to protrude upward from the upper surface 136a, so that a distance therebetween in the right and left direction is widened as they go upward. A corner portion between each of opposing inner surfaces 134d of the pair of arm portions 134a facing each other and the upper surface 136a of the locking claw base portion 136 is provided with a locking protrusion 138 at the middle thereof in the X-axis direction (forward and rearward direction). A shape of the locking protrusion 34 in the YZ plane is a rectangular shape surrounded by one side, which extends from the upper surface 136a of the locking claw base portion 136 at a right angle and is positioned along the Z-axis direction (upward and downward direction), and another side, which reaches the middle of the inner surface 134d of the corresponding locking claw 134 and is positioned along the Y-axis direction (right and left direction). A width of the locking protrusion 138 in the X-axis direction (forward and rearward direction) has a predetermined length and is substantially constant. A distance between a pair of locking protrusions 138 has such a length that, when the locking protrusions 138 are respectively inserted from both sides into the pair of locking recess portions 130 located on both side of the cover-material fixing end member 118 with the tape member 16 interposing therebetween, the locking protrusions 138 respectively abut against the flat surface portions 130a with a proper force. Accordingly, the pair of locking claws 134 is elastically deformed to be slightly opened and thus to become an urging state, thereby clamping the locking recess portions 130 therebetween.

Next, a method of using the cover-material fixing tool 116 of the present embodiment will be described. First, the clip 120 is attached at any location on the clip locking member 122 of the cover-material fixing end member 118 of the cover-material fixing tool 116 stitched on the cover-material 66. A plurality of clips 120 are attached along the longitudinal direction of the clip locking member 122 at predetermined intervals. When the lower edge portion 124 of the clip locking member 122 is pressed in between the pair of locking claws 134, the pair of locking claws 134 are elastically deformed and widened and thus the lower edge portion 124 passes therebetween. Once the lower edge portion 124 passes therebetween, the elastic deformation of the locking claws 134 is reduced and thus the distal end portions 134b of the pair of locking claws 134 are inserted into the respective groove portions 128 of the clip locking member 122. Then, the lower edge portion 124 is fitted between the pair of locking claws 134 and thus does not fall out therefrom. The locking protrusions 138 of the locking claws 134 are respectively inserted into the locking recess portions 130 of the lower edge portion 124 and abut against the flat surface portions 130a. Accordingly, the flat surface portions 130a are clamped between the pair of locking claws 130 with a certain force by an elastic force. A frictional force occurs between the locking protrusions 138 and the flat surface portions 130a and thus the clip 120 is locked so as not to move in the X-axis direction (forward and rearward direction). On the other hand, if a force greater than the frictional force is exerted on the clip 120, the clip 120 is slidingly moved. However, the locking protrusions 138 cannot move over the stopper 132 and thus are stopped at a location abutting against the stopper 132. Therefore, the clip 120 can move within a predetermined length between a pair of stoppers 132.

The cover-material fixing tool 116 of the present embodiment is used by an operation similar to those of the foregoing embodiment and has effects similar thereto. The clip 120 can slide between the pair of stoppers 132 of the clip locking member 122. Thus, an internal stress can be released by moving the clip 120. As a result, wrinkles do not occur on the cover-material 66 so that the cover-material 66 can be flatly covered on the cushion material 64 and thus can be neatly finished. Since the clip 120 cannot slide beyond the distance between the pair of stoppers 132, the clip 120 does not be largely slid even if a strong force is exerted on the clip 120 when the clip 120 is attached on or detached from the wire 70, thereby facilitating an attaching or detaching operation thereof. The clip 120 is locked so as not to move even between the pair of stoppers 132 if a force smaller than the frictional force is exerted thereon, thereby further facilitating the attaching or detaching operation. By changing a depth of the locking recess portions 130 or a size of the locking protrusions 138, a resistance to sliding can be arbitrarily set.

Additionally, the cover-material fixing tool of the present invention is not limited to the foregoing embodiments, but detailed shapes, dimensions and the like thereof may be appropriately changed. A material, surface finish, color and the like for the clip locking member of the cover-material fixing end member or the clip can be freely selected. If instead of the wire, the locked member has a locked portion, on which a locking portion, such as the hook of the clip, can be locked, materials or shapes thereof does not matters. For example, the locked member may have a hook-shaped locked portion made of resin, on which the hook of the clip can be locked. Structures other than those as described above may be employed for locking the clip on the clip locking member to prevent the clip from being moved by a moderate force, and also a magnitude of an engaging force, a distance between the stoppers and the like can be arbitrarily set.

DESCRIPTION OF REFERENCE NUMERALS 10, 74, 94, 116 Cover-material Fixing Tool
12, 76, 96, 118 Cover-material Fixing End Member
14, 78, 98, 120 Clip
16 Tape Member
18, 80, 100, 122 Clip Locking Member
26, 130 Locking Recess Portion
27, 88c, 108c, 132 Stopper
30, 90, 110, 134 Locking Claw
30a, 134a Arm Portion
32, 136 Locking Claw Base Portion
34, 92, 114, 138 Locking Protrusion
70 Wire (Locked Member)
86, 106 Groove Portion
88 Side Wall Surface Portion
88a, 108 Ridge
88b, 108b Valley Portion
102a Upper Surface
130a Flat Surface Portion
134d Inner Surface

The invention claimed is:

1. A cover-material fixing tool configured to be attached on a cover-material and to be locked on a locked member installed in a cushion material, comprising:
a cover-material fixing end member configured to be attached on the cover-material; and
a clip configured to be attached on the cover-material fixing end member,
wherein the cover-material fixing end member comprises a tape member configured to be fixed on an end edge portion of the cover-material, a clip locking member attached along a longitudinal direction on a side edge portion of the tape member opposite to the cover-material, and a plurality of stoppers formed on the clip locking member at equal intervals along the longitudinal direction,
wherein the clip comprises a locking portion for holding the clip locking member to allow the clip locking member to move in the longitudinal direction, and a locking protrusion protruding toward the clip locking member and configured to abut against the stoppers, and
wherein the clip is movable between the adjacent stoppers to allow position adjustment thereof,
wherein the clip is movable between the adjacent stoppers to allow position adjustment thereof,
wherein on the clip locking member, a plurality of locking recess portions configured to allow the locking protrusion of the clip to be inserted therein are formed at equal intervals along the longitudinal direction, wherein a part between each pair of locking recess portions defines each of the stoppers, and
wherein a length of the locking recess portions in the longitudinal direction is formed to be greater than a width of the locking protrusion in the longitudinal direction such that the locking protrusion of the clip is movable in the longitudinal direction between the stoppers at both sides of each of the locking recess portions to allow the position adjustment of the clip.

2. The cover-material fixing tool according to claim 1, wherein the locking portion of the clip is provided with a pair of locking claws for holding the clip locking member, and wherein the locking protrusion is provided on each of opposing inner surfaces of arm portions of the pair of locking claws.

3. The cover-material fixing tool according to claim 1, wherein the adjacent stoppers have a contact surface with the locking protrusion, and wherein the contact surface is inclined toward a distal end side of the stoppers in a protruding direction thereof, so that the locking recess portions are widened.

4. The cover-material fixing tool according to claim 2, wherein a length obtained by subtracting the width of the locking protrusions from the length of the locking recess portions in the longitudinal direction is shorter than a length from an end portion of the locking claws to the locking protrusions.

5. A cover-material fixing tool configured to be attached on a cover-material and to be locked on a locked member installed in a cushion material, comprising:
a cover-material fixing end member configured to be attached on the cover-material; and
a clip configured to be attached on the cover-material fixing end member,
wherein the cover-material fixing end member comprises a tape member configured to be fixed on an end edge portion of the cover-material, a clip locking member attached along a longitudinal direction on a side edge portion of the tape member opposite to the cover-material, and a plurality of stoppers formed on the clip locking member at equal intervals long the longitudinal direction,
wherein the clip comprises a locking portion for holding the clip locking member to allow the clip locking member to move in the longitudinal direction, and a locking protrusion protruding toward the clip locking member and configured to abut against the stoppers, wherein the clip is movable between the adjacent stoppers to allow position adjustment thereof, and
wherein the clip locking member has a lower edge portion formed to allow the pair of locking claws to be held thereon, and wherein on a side surface wall portion of the groove portion, which is a surface parallel to a side surface of the tape member, a plurality of ridges and valley portions between each pair of ridges are consecutively provided along the longitudinal direction to allow the locking protrusion to be locked thereon, and also the stoppers are provided at equal intervals along the longitudinal direction to further protrude than the ridges.

6. A cover-material fixing tool configured to be attached on a cover-material and to be locked on a locked member installed in a cushion material, comprising:
  a cover-material fixing end member configured to be attached on the cover-material; and
  a clip configured to be attached on the cover-material fixing end member,
  wherein the cover-material fixing end member comprises a tape member configured to be fixed on an end edge portion of the cover-material, a clip locking member attached along a longitudinal direction on a side edge portion of the tape member opposite to the cover-material, and a plurality of stoppers formed on the clip locking member at equal intervals along the longitudinal direction,
  wherein the clip comprises a locking portion for holding the clip locking member to allow the clip locking member to move in the longitudinal direction, and a locking protrusion protruding toward the clip locking member and configured to abut against the stoppers,
  wherein the clip is movable between the adjacent stoppers to allow position adjustment thereof,
  wherein on the clip locking member, a plurality of locking recess portions configured to allow the locking protrusion of the clip to be inserted therein are formed at equal intervals along the longitudinal direction, wherein a part between each pair of locking recess portions defines each of the stoppers,
  wherein a length of the locking recess portions in the longitudinal direction is formed to be greater than a width of the locking protrusion in the longitudinal direction,
  wherein the locking portion of the clip is provided with a pair of locking claws for holding the clip locking member,
  wherein the locking protrusion is provided on each of opposing inner surfaces of arm portions of the pair of locking claws, wherein each of the locking recess portions is provided with a flat surface portion, which is a surface parallel to a side surface of the tape member, and
  wherein a distance between a pair of locking protrusions has such a length that, when the locking protrusions are respectively inserted from both sides into a pair of locking recess portions located on both side of the cover-material fixing end member with the tape member interposing therebetween, the locking protrusions respectively abut against the flat surface portions, thereby allowing the pair of locking claws to clamp the locking recess portions therebetween so that sliding thereof along the longitudinal direction is locked by a frictional force.

* * * * *

UNITED STATES PATENT AND TRADEMARK OFFICE
CERTIFICATE OF CORRECTION

PATENT NO. : 10,820,719 B2
APPLICATION NO. : 16/087264
DATED : November 3, 2020
INVENTOR(S) : Ryuichi Murasaki et al.

Page 1 of 1

It is certified that error appears in the above-identified patent and that said Letters Patent is hereby corrected as shown below:

In the Specification

In Column 4, Line 47, before "third" delete "second".

In Column 4, Line 50, before "third" delete "second".

In the Claims

In Column 20, Line 51, in Claim 5, delete "long" and insert -- along --, therefor.

Signed and Sealed this
Ninth Day of March, 2021

Drew Hirshfeld
*Performing the Functions and Duties of the
Under Secretary of Commerce for Intellectual Property and
Director of the United States Patent and Trademark Office*